FIG. 1

INVENTOR.
FRANK J. DiFRANK
BY W.A. Schaich &
Thomas A. Meehan
ATTORNEYS

FIG. 3

May 19, 1970  F. J. DI FRANK  3,512,459

CONTAINER BLANK HANDLING APPARATUS

Filed July 14, 1967  9 Sheets-Sheet 4

INVENTOR.
FRANK J. DiFRANK
BY W. A. Schaich &
Thomas A. Meehan
ATTORNEYS

INVENTOR.
FRANK J. DiFRANK
BY W. A. Schaich &
Thomas A. Meehan
ATTORNEYS

FIG. 15

United States Patent Office 3,512,459
Patented May 19, 1970

3,512,459
CONTAINER BLANK HANDLING APPARATUS
Frank J. DiFrank, 3442 Woodley Road,
Toledo, Ohio 43606
Filed July 14, 1967, Ser. No. 653,449
Int. Cl. B31b 1/26
U.S. Cl. 93—51
6 Claims

ABSTRACT OF THE DISCLOSURE

This application discloses apparatus for successively transferring relatively flat fibreboard container blanks in a vertical stack thereof to another location for processing of the blanks at such other location, for example, for erection of the blanks into upright trays. The apparatus comprises a vertical hopper with a gate feed release system and a horizontally reciprocatable vacuum feed table. The feed table grasps, by vacuum, the lowermost of the blanks in the hopper when the feed table is in a given or first position and transfers such blank through the gate as the feed table is moved to another or second position. Reciprocation of the feed table is effected by a double acting pneumatic cylinder.

BRIEF SUMMARY OF THE INVENTION

As is understood in the packaging art, the five-sided or open-topped corrugated fibreboard tray is ideally suited for many packaging applications, for example, as an outer shipping container for a number of individual carrier packages of malt beverage or soft drink products in nonreturnable glass bottles or metal cans. Five-sided trays are used in great quantity for these packaging applications and it has long been recognized that it is desirable to erect such trays from the original blanks on a high-speed mechanized basis with a minimum of manual labor. A variety of types of tray-forming machines are known in the art and some of these have enjoyed a widespread degree of commercial application.

Known types of tray-forming machines are characterized by a tray forming station, where an individual blank is formed into a tray, by a magazine for storing a multiplicity of flat blanks in a vertical stack, and by transfer means for successively transferring individual blanks from the magazine to the forming station. However, a number of problems have been encountered in the operation of prior-art tray forming machines, normally due to the fact that the machines have not been properly designed to compensate for the rather wide inherent variations in the production of tray blanks from corrugated fibreboard, the material most widely used in the manufacture of five-sided trays. In addition to the fact that manufacture of corrugated fibreboard articles is subject to larger dimensional tolerances, such articles are also subject to score fade out and warpage, which may vary in degree and in direction from one lot of blanks to another.

Among the problems encountered in the use of prior art mechanized tray forming machines is the problem of accurately positioning the corrugated blank under the forming mandrel at the forming station so that the fold or score lines of the blank are aligned with the mandrel within limits which are narrower than standard manufacturing tolerances followed in the cutting of the corrugated blanks. Because prior attempts to solve this problem have not been entirely satisfactory, prior art tray forming machines are characterized in their operation by the production of large quantities of trays which are not of desired quality and many of which must be scrapped. These problems are largely overcome in the present invention by means which accurately positions a blank on a transfer table, both laterally and longitudinally, and which then transfers the blank, without relative movement between the blank and the table, to an accurately controlled forming position.

Lateral positioning of the blank is effected by positioning the blanks in the charge magazine or hopper by the intermediate longitudinally extending, end-wall panel defining slots rather than by the end edges of the blanks. This is effective since the placement and spacing of such slots can be, and usually is, controlled within narrower manufacturing tolerances than the spacing between the end edges.

Accuracy in the longitudinal placement of a blank on the transfer table of the present invention, notwithstanding normal variations in blank length due to varying degrees and directions of warpage, is attained by using a hollow or tubular transfer table with a perforated blank contacting surface and by maintaining the transfer table in communication with a vacuum source during its transfer movement. The use of a vacuum transfer device in this manner causes the blanks to assume a flattened condition on the transfer table, thereby eliminating length variations due to blank warpage.

Accordingly, it is an object of the present invention to provide improved apparatus for transferring individual platular objects, in succession, from a vertical stack of such objects.

It is a further object of the present invention to provide, in apparatus for forming five-sided trays from corrugated fibreboard blanks vertically stacked in a hopper, improved transfer means for transferring blanks, in succession, from the hopper to the forming station with improved accuracy of positioning.

It is a further object of the present invention to provide a vacuum transfer table for transferring flat objects subject to warpage in an unwarped condition.

It is a further object of the present invention to provide a feed hopper for corrugated fibreboard tray blanks having spaced pairs of aligned panel-defining slots in which the blanks are positioned, in a direction transversely of such slots, by the slots themselves rather than by the edges of the blanks.

For a further understanding of the present invention, attention is directed to the following portion of the specification, the drawing and the appended claims.

DETAILED DESCRIPTION OF THE INVENTION

General sequence of operations

Figure 1:
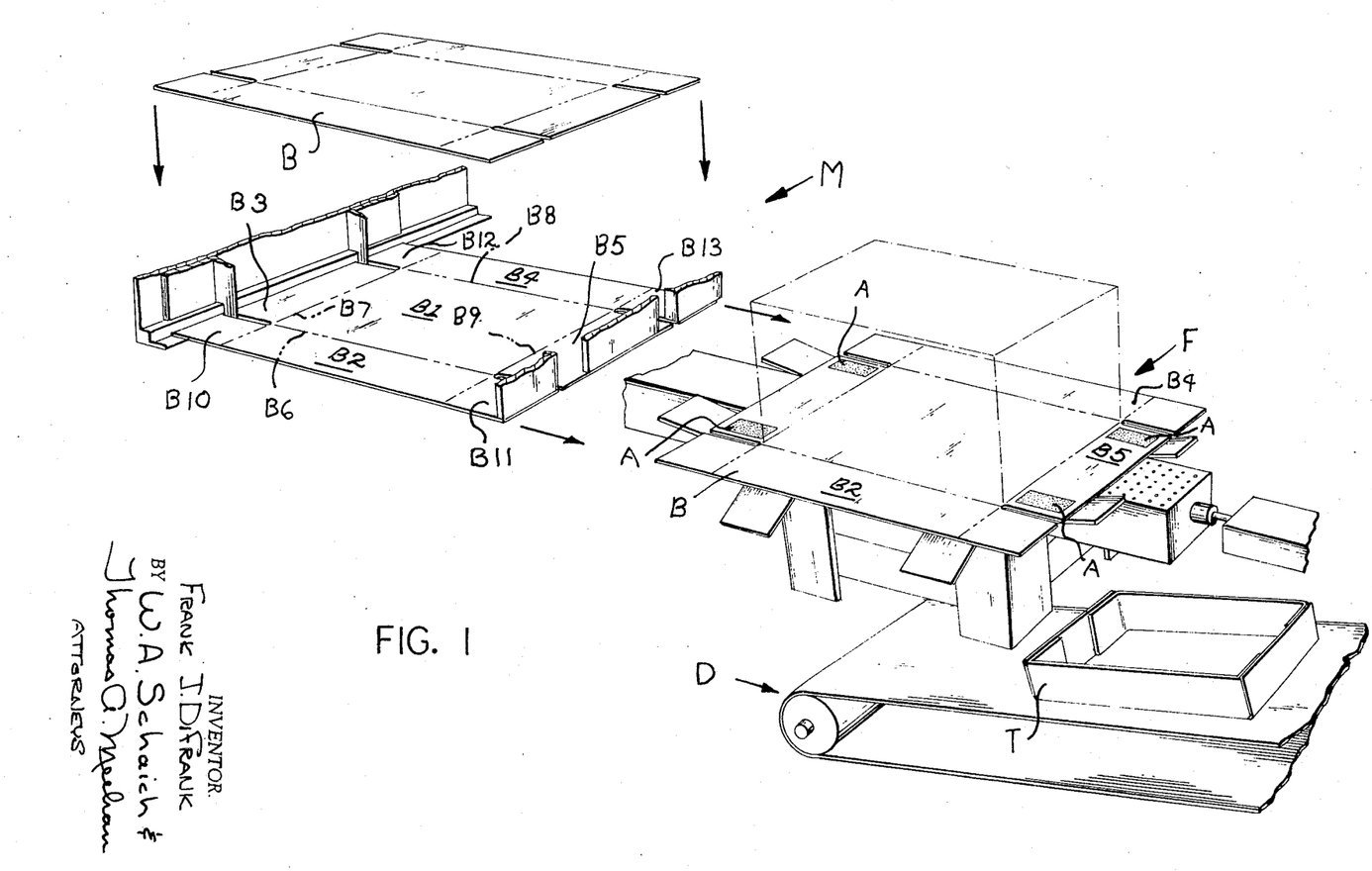
FIG. 1 is a schematic view, in perspective, showing the sequence of steps involved in forming five-sided trays from planar tray-forming blanks of corrugated fibreboard, or equivalent, in accordance with the present invention.

As is shown in FIG. 1, the present invention is concerned with the mechanical formation of an open-topped or five-sided tray-type container T from a generally planar blank B, and with the repeated and relatively continuous formation of such containers from blanks which are delivered, in sequence, to a forming station F from a supply of such blanks arranged in a supply or magazine station M. Blanks B are formed from a suitable relatively rigid sheet-like material, such as corrugated fibreboard, and are pre-cut and deformed along pre-selected fold lines, as by scoring. Such fold lines and cuts serve to divide the blank into identifiable portions comprising a rectangular central panel portion B1 surrounded by a perimetrical series of wall-forming panels B2–B5, inclusive, each of which is foldable relative to panel B1 along the edge it shares with the central panel, as indicated by fold lines B6–B9, respectively. Blank B is further cut along extensions at the ends of lines B6 and B8 and is scored along extensions at the ends of lines B7 and B9 to provide foldable flaps B10 ad B11 at the ends of panel B2 and foldable flaps B12 and B13 at the ends of panel B4, which is opposed to panel B2 in the perimetrical series.

In the illustrated embodiment of a tray-former of the present invention, the container blanks are stacked in a vertical stack in magazine section M and are transferred one at a time, from the bottom of the stack, by reciprocatable transfer means to forming station F. Forming station F is provided with a rectangular mandrel, shown in dotted line in FIG. 1, which is brought into registered contact with, and is outlined by, central panel B1 of a blank. Thereupon, by suitable means, as later described more fully, panels B2 and B4 are folded to upright positions against a pair of sides of the mandrel and at right angles to panel B1, flaps B10–B13 are folded inwardly to positions against the other sides of the mandrel and at right angles to panel B1 and to panels B2 and B4, and flaps B3 and B5 are folded to at least partially upright positions. In the preferred embodiment, while blank B is in the position of FIG. 1, flaps B3 and B5 are folded only through an acute angle sufficiently great to positively frictionally engage the lowermost edges of flaps B10–B13. Thereupon, the partially formed tray is lowered into the subjacent throat or compression chamber C which is of rectangular outline, and the movement of the flaps B3 and B5 relative to the walls of chamber C completes the folding of flaps B3 and B5 to upright positions in contact with the underlying pair of flaps B10–B13 and at right angles to panel B1 and to panels B2 and B4.

At a point in time prior to the completion of the lowering of the partly formed tray into chamber C an adhesive is introduced between the flaps B10–B13 and the overlying portions of panels B3 and B5 so that, with provision for a suitable period of dwell in chamber C, the adhesive will set while the tray is in the chamber, thereby permanently securing the tray in its formed state. The adhesive introduction is conveniently accomplished with standard commercially available glue spraying equipment that applies adhesive to regions A located toward opposite ends of the top surface of each of panels B3 and B5. For example, the adhesive may be sprayed on the indicated areas as the blank is being transferred from the magazine M to the forming station F.

The formed trays are advanced through chamber C in a downward direction in intermittent fashion by the introduction of additional trays into the top of the chamber. To provide the required dwell time for adhesive setting, which will ordinarily be of somewhat longer duration than the tray forming cycle, the chamber is constructed with a depth sufficient to accommodate several superimposed trays. After the chamber is filled, the addition of a new tray to the top of the chamber will cause the lowermost tray in the chamber to fall therefrom. Subsequent handling of the tray may conveniently involve the use of a conveyor D, with a portion stationed beneath chamber C, to deliver the formed trays to the packing area, or to storage.

Figure 2:
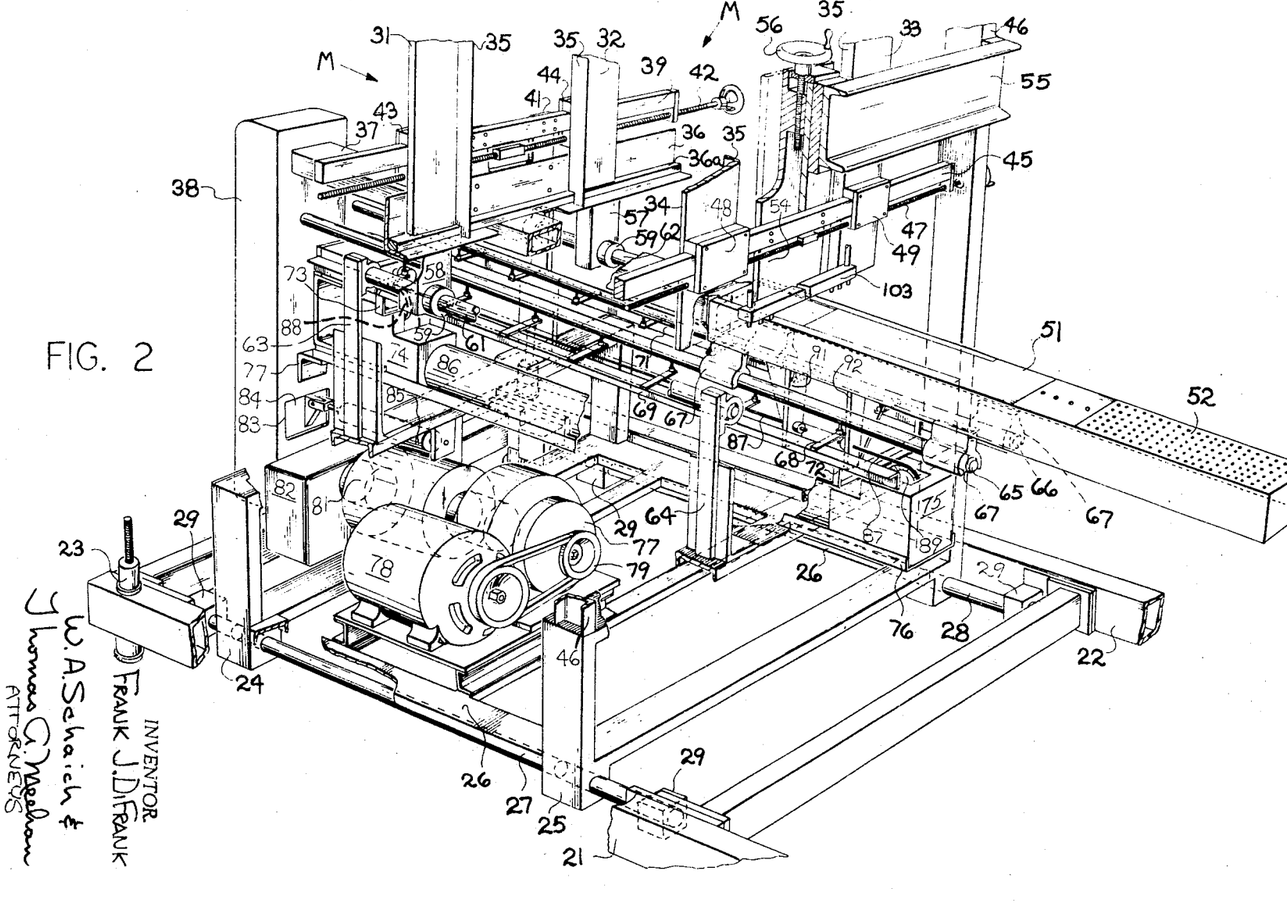
FIGS. 2 and 3 are perspective views each showing, generally, opposite ends of a tray-forming machine embodying the present invention.

Description of the tray-former—structural (FIG. 2)

Figure 3:
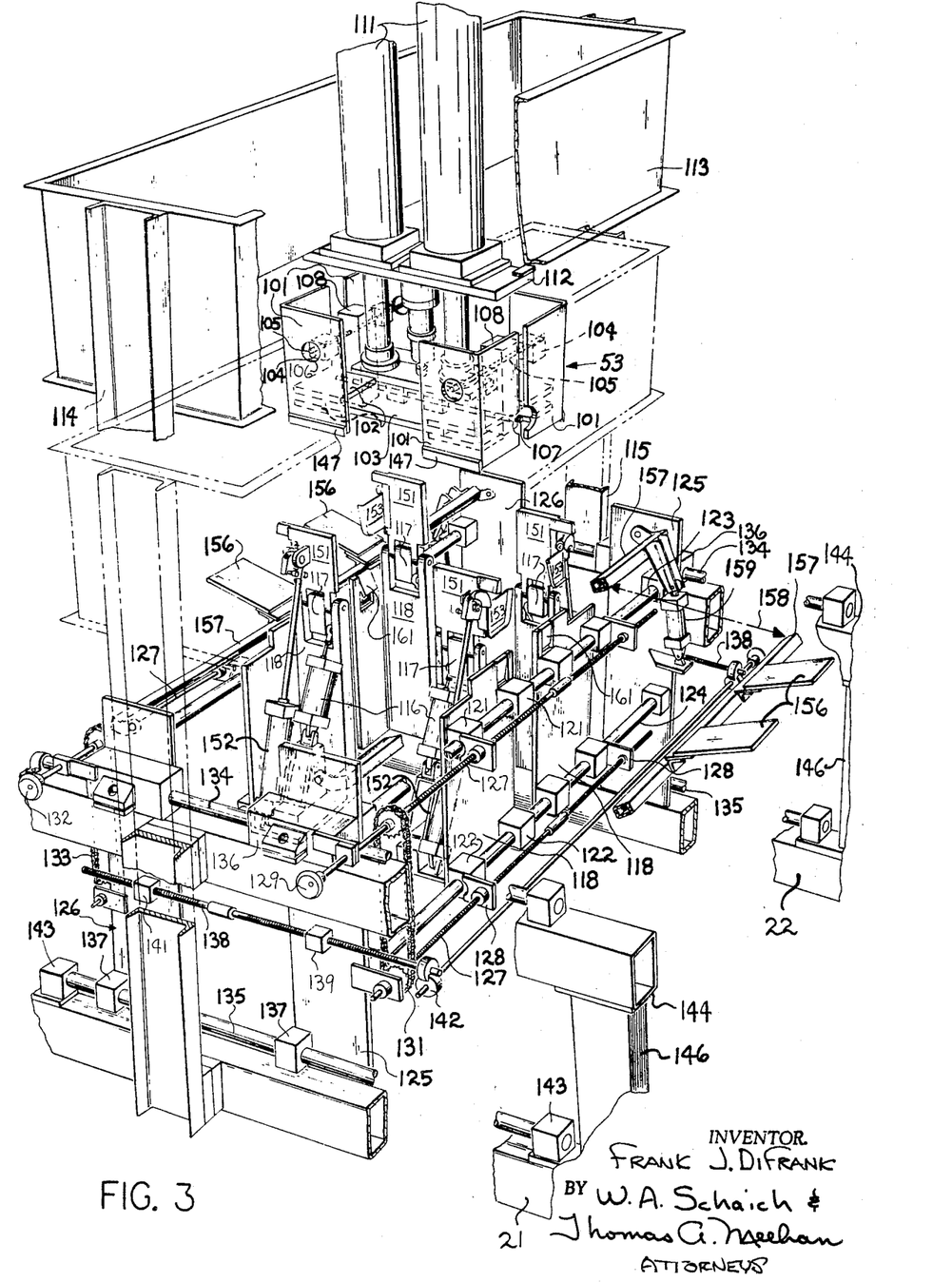
Figure 4:
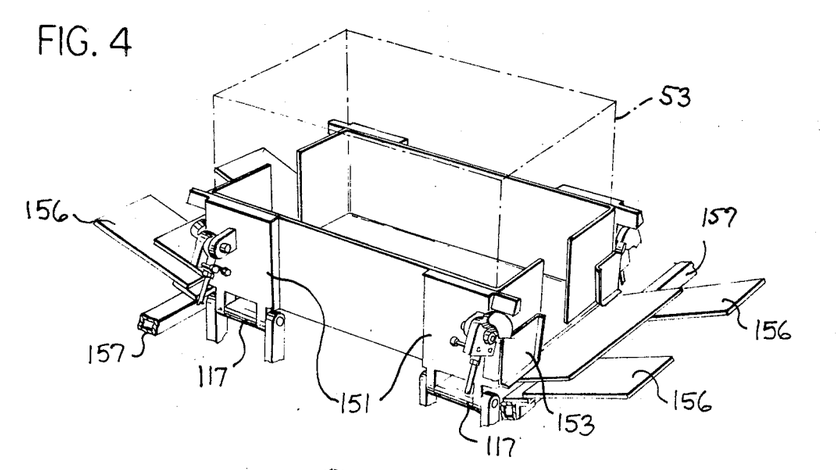
FIGS. 4 and 5 are enlarged fragmentary perspective views showing a series of steps in the tray-forming action of the machine of FIGS. 2 and 3.
Figure 5:
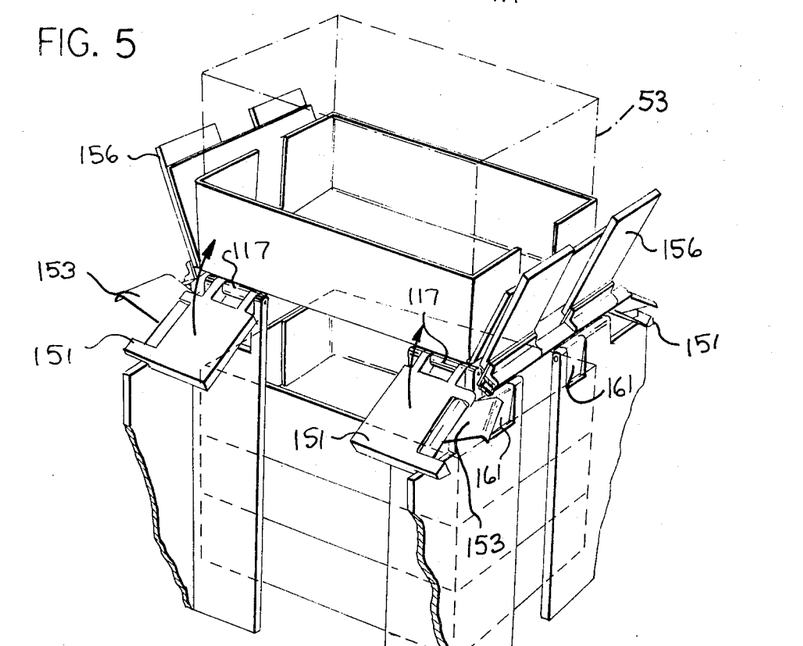
Figure 6:
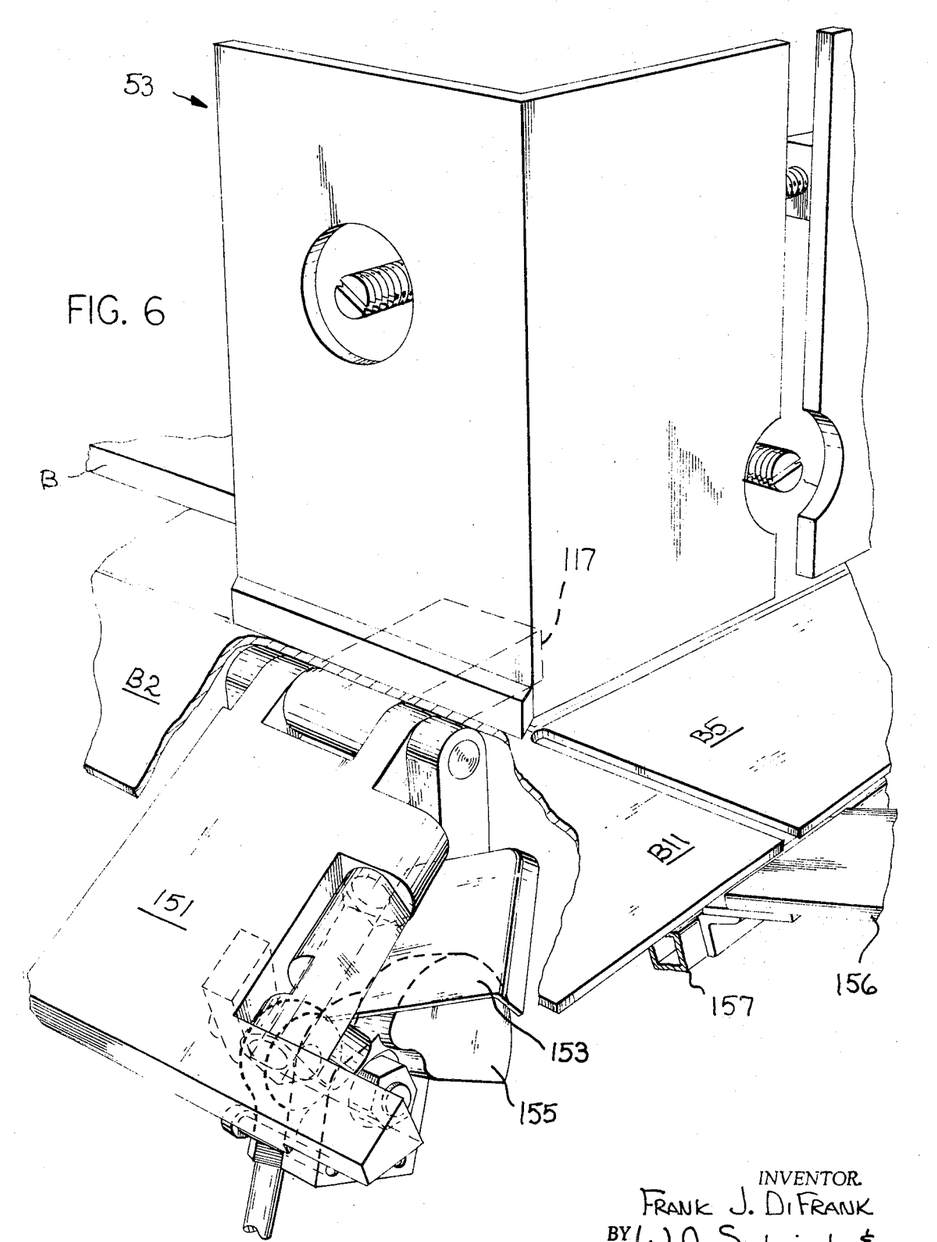
FIGS. 6 and 7 are fragmentary perspective views, at a further enlarged scale, showing further construction details of the machine of FIGS. 2–5.
Figure 7:
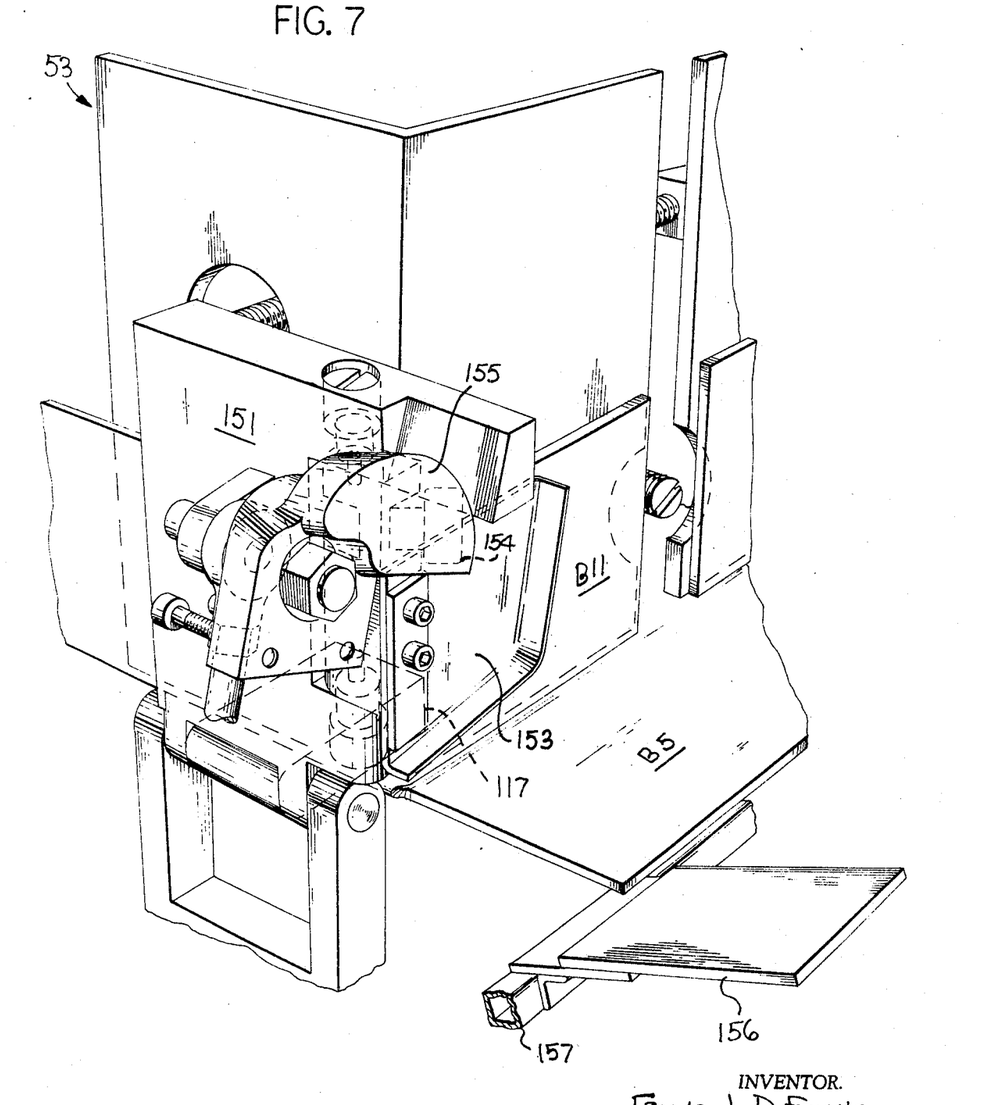
Figures 8, 9:
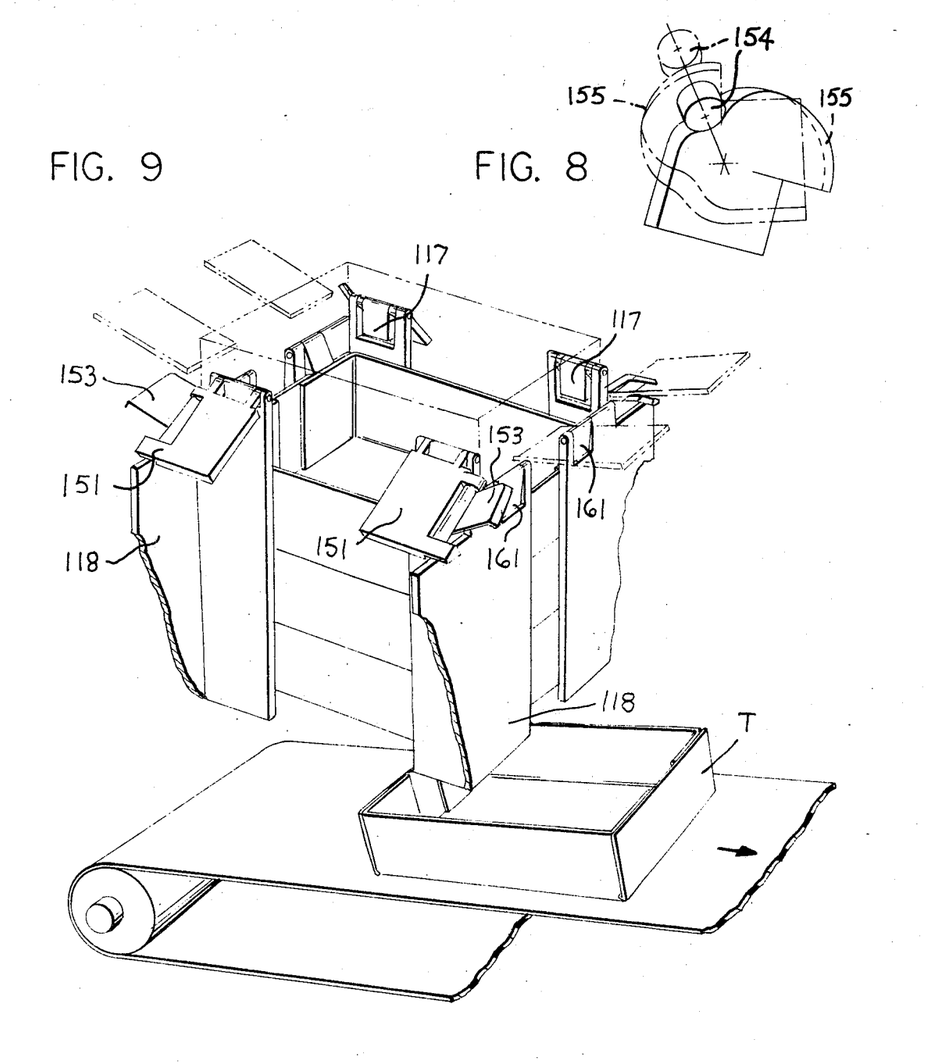
FIG. 8 is a cam diagram illustrating a camming feature of the machine of FIGS. 2–7.
FIG. 9 is a fragmentary perspective view showing further construction details of a portion of the machine of FIGS. 2–7.
Figure 10:
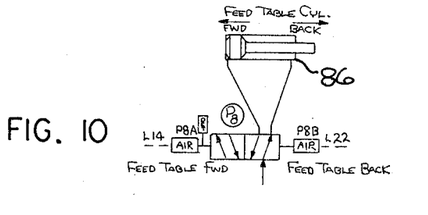
FIGS. 10–14 are schematic views showing pneumatic cylinders for operating the various mechanisms of the machine of FIGS. 2–9, and the relationship of such pneumatic cylinders to the motion control valves and elements of FIG. 15.
Figures 11, 12, 13, 14:
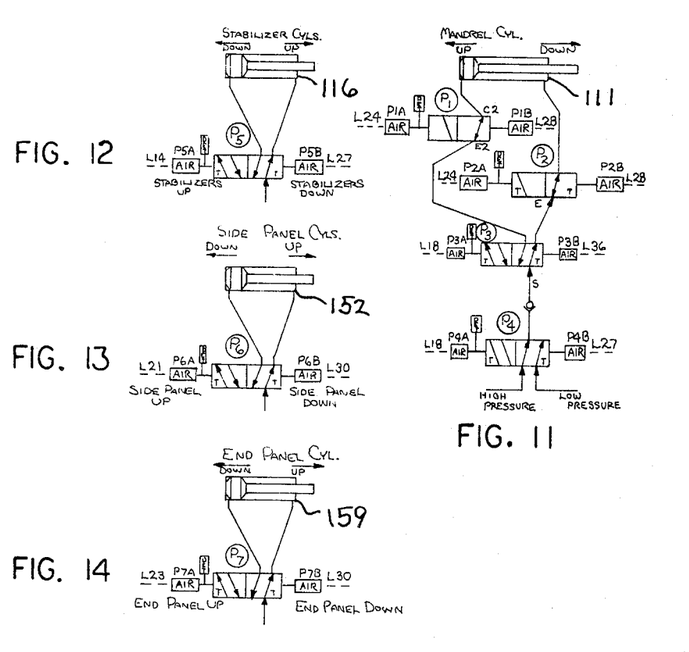

FIGS. 2 and 3, when considered together, show a complete tray-forming machine according to the present invention, with FIG. 2 showing the structure of the front end of the machine and of the blank storage and transfer apparatus which are located toward the front end, and with FIG. 3 showing the structure of the rear end of the machine and of the tray forming apparatus which is located at the rear end of the machine. All of the structure of the machine is supported on a pair of rigid, longitudinally extending, tubular side rails 21 and 22, shown in both FIGS. 2 and 3, each of which may be supported on a plant floor, or other relatively level surface, by a pair of vertically adjustable feet 23 located at opposite ends thereof.

Much of the structure at the front end of the machine is supported, from members 21 and 22 and at a location thereabove, by means of a framework comprising first and second upright, transversely extending, rectangular members 24 and 25 which are rigidly connected to one another at their lowermost corners by longitudinally extending members 26. The structure comprising members 24 and 25, is adjustably positioned, relative to members 21 and 22 of the machine, by slidably mounting members 24 and 25 on spaced, longitudinally extending rods 27 and 28. Rods 27 and 28, in turn, are attached to members 21 and 22, by spaced apart mounting blocks 29.

Horizontally-aligned tray-forming blanks, shown only in FIG. 1, are stacked, in a vertical stack as by hand, in a magazine section M of the tray-forming machine, preferably with the slotted extensions of fold lines B6 and B8 running longitudinally of the machine. Optimum lateral positioning of the blanks is obtained by positioning the blanks from the slots, rather than from the side edges, by constructing the magazine with upright corner posts 31–34 each of which is provided with an inwardly-extending, slot-engaging flange 35.

The end of the stack of blanks adjacent posts 31 and 32 is supported by the underlying, inwardly extending, horizontal lower flange of an L-shaped member 36 which is provided with a square bar 36a at the juncture of the legs thereof to accurately longitudinally position the lowermost blank. Member 36 is centrally supported at a location somewhat higher than horizontally aligned and longitudinally extending member 37, by means hereinafter described more fully. Member 37, which is tubular in construction for reasons to be pointed out later, is supported at one end by upright member 38, which is also tubular for similar reasons, which, in turn, is supported on rectangular member 24.

Members 31 and 32 are mounted from horizontally extending slide bar 39 which is supported by a yoke 41 extending upwardly from member 36. The relative spacing between members 31 and 32 may be adjusted, to accommodate blanks of different sizes, by a hand-crank operated elongate bolt 42 which is threaded in opposite directions on each end and which is received in threaded blocks 43 and 44 attached to members 31 and 32, respectively. Likewise members 33 and 34 are slidably mounted on a horizontal transversely extending bar 45, which is supported from vertical extension posts 46 of member 25, and the spacing therebetween is adjustable by means of a similar hand-crank operated two-way bolt 47 passing through threaded blocks 48 and 49 on members 33 and 34.

The end of the stock of blanks adjacent members 33 and 34 is supported on a work transfer table 51 which is reciprocated to and fro in a generally horizontal plane to move a blank-engaging end portion 52, which is foraminous in nature for reasons which will be hereinafter discussed more fully, from a first position beneath magazine M (FIG. 2) to a second tray forming position F beneath forming mandrel 53 (FIG. 3), and then back.

To limit egress of blanks from magazine M, upon movement of portion 52 of table 51 to position F, to the transfer of a single blank, there is provided a platular downwardly extending gate 54, located centrally between members 33 and 34, whose lowermost edge terminates above table 51 by a distance which is greater than the thickness of a blank and is less than twice the thickness of a blank. Gate 54 is supported from a structural member 55, which extends between uprights 46, and its vertical position may be adjusted in a precisely controlled fashion, to accommodate blanks of varying thickness and/or varying degrees and/or directions of warpage, by a hand crank operated bolt 56 which passes through a threaded extension of the gate.

The longitudinal extent of magazine M may be varied by slidably mounting the structure comprising corner posts 31 and 32 and member 36, by means of downwardly depending legs 57 and 58, each comprising a bushing 59, on spaced longitudinally extending slide bars 61 and 62. Each of slide bars 61 and 62 are supported, fore and aft, by upright members 63 and 64 extending upwardly from the top members of rectangular frames 24 and 25, respectively. Locking means (not shown) are, of course, provided to lock legs 57 and 58 in any desired position on bars 65 and 66.

Work transfer table 51 receives tubular member 37 and is coaxial therewith and is freely slidable back and forth over the terminal end of member 37 on a pair of spaced apart longitudinal support bars 65 and 66 by means of a number of double-ended arcuate bushings 67 which slidably engage bars 65 and 66 for arcs in excess of 180°. Each of bars 65 and 66 is supported from the bottom at a multiplicity of points along its extent by horizontally extending fingers 68 which are cantilevered inwardly in a pair of rows from longitudinally extending members 69 and 71 underlying bars 65 and 66, respectively. Members 69 and 71 are supported, fore and aft, on common yoke members 72 and 73 which, in turn, are supported on slotted block-like members 74 and 75 which are contained in an upwardly facing, longitudinally-extending channel 76. Channel 76 is supported at spaced locations on the upper transversely extending elements of rectangular frames 24 and 25 and one of its free ends rests on a ledge of member 38 formed by a short length of angle iron 77.

As the charge table advances from the magazine station to the forming station, the blank is held in firm engagement with the blank-engaging portion 52 thereof by virtue of the fact that the portion 52 is of foraminous or perforate construction and by reason of negative pressure, or partial vacuum which is maintained in the communicating tubular members 51, 37 and 38. Such partial vacuum is provided by means of a centrifugal vacuum pump 77 which is powered by an electric motor 78 through a V-belt drive 79. Vacuum pump 77 is connected, by means of a bellows-type sleeve 81, to a plenum chamber 82 communicating with the inlet to member 38. Chamber 82 is preferably divided into sections by a transversely extending filter member (not shown). To effect clean disengagement of surface 52 from the blank once surface 52 is in position at the forming station, means are provided to break the partial vacuum in member 51. Such means may comprise a port 83 in one of the members in the vacuum circuit, shown as member 38, which is normally closed by means of a hinged valve 84. Valve 84 is temporarily moved to a non-closing position at the start of the retraction of table 51, as by means of a double-acting cylinder 85 attached to frame 24.

Reciprocation of work transfer table 51 is actuated by means of a two-way pneumatic cylinder 86 mounted in channel 76. Attached to opposite sides of the piston (not shown) which moves back and forth in cylinder 86 is one end of each of a pair of double-ended flexible cables 87. Cables 87 are trained around pulleys 88 and 89, respectively, which are rotatingly mounted in members 74 and 75. The other ends of cables 87 are secured, respectively to members 91 and 92 attached to, and depending downwardly from, table 51. As each blank is being transferred from the magazine M to the forming station F by the work transfer table 51, adhesive may be sprayed at locations A (see FIG. 1) by spray heads located at preselected positions on an adhesive distributing bar 103 extending between columns 46 of the machine framework.

Description of the tray-former—structural (FIGS. 3 and 4-9)

The forming mandrel 53, shown in FIG. 3, is comprised of four spaced-apart upright L-shaped members 101 whose lower edges lie in a common plane along the outline of a rectangle. Each L-shaped member is gusseted, at right angles to the legs, by a pair of parallel, spaced-apart plates 102 and the members are longitudinally and laterally slidable on the edges of a center support structure 103 which passes through plates 102. The lateral spacing between the members 101 in the forward pair and between the members 101 in the rearward pair may be adjusted to accommodate blanks of varying sizes by providing each member with an internally threaded block 104 attached thereto and by making the members laterally slidable on structure 103 under action of a pair of laterally extending adjusting screws 105, each of which is threaded in opposite directions on each end and each of which passes through the blocks 104 of a pair of members 101. Each screw is accessible from locations externally of the mandrel structure, and on both sides of the mandrel, through suitably situated apertures 106 in the longitudinally extending leg of each L-shaped member. The longitudinal spacing between the front pair and the rear pair of L-shaped members may also be adjusted by means of longitudinally extending screw 107 which passes through blocks 108 each of which is attached to the adjusting screw common to each pair of L-shaped members.

Mandrel 53 is movable vertically upwardly and downwardly by attaching structure 103 to the free ends of the piston rods of a pair of parallel double-acting pneumatic cylinders 111. Cylinders 111 are mounted on a plate-like structure 112 extending longitudinally and centrally of a rectangular frame-like structure 113 which is supported in a horizontal plane by upright members 114 and 115 extending, respectively, from tubular members 21 and 22. Structure 113, and the members attached thereto, are shown in solid line in FIG. 3 as being broken away from the rest of the tray-forming structure of the machine for the sake of clarity; the actual position of structure 113 is shown in discontinuous line.

When a blank is in position to be formed into a tray under mandrel 53, the mandrel is moved downwardly by cylinders 111 until it engages, and is outlined by, the central panel B1 of the blank (see FIG. 1). At this point in time the blank is secured in position relative to the mandrel by actuating four pneumatic cylinders 116 to move downwardly vertically extending stabilizing bars 117, which lie in the rectangular array and which are pivoted about parallel longitudinally extending axes, to move through approximately 90° arcs to engage the underside of the blank. At this point in time the feed table may be retracted.

Each of stabilizing bars 117 is mounted in a vertical slot near the upper end of the center, longitudinally extending leg of a vertically-extending T-shaped member 118. Four spaced-apart members are provided and they are arranged in a rectangular array with the top legs lying in vertical, transversely extending planes. In this manner the L-shaped portion of each T-shaped member comprising the center leg and half of the top leg lie along the outline of a rectangle, which is similar to and slightly larger than the rectangle defined by L-shaped members 101 of mandrel 53, and such L-shaped portions define a compression chamber underlying the original plane of the blank under mandrel 53. The remote side of the transversely extending top side of each T-shaped member is provided with a pair of upper blocks 121 and a pair of lower blocks 122 for slidable attachment, respectively, to upper and lower transversely extending bars 123 and 124. The forward pair of bars 123 and 124 extend between a pair of oppositely disposed mounting plates 125 and the rearward pair of bars 123 and 124 extend between a pair of oppositely disposed mounting plates 126. The sliding movement of each T-shaped member 118 on bars 123 and 124 is accomplished by means of four bolts 127, each of which threaded in opposite directions on each end, which pass through an internally threaded extension 128 attached to one of the blocks 122 in each pair. Each of the forward pair of bolts 127 is turned simultaneously through a single crank 129 connected to each of the screws through an endless roller chain and sprocket arrangement 131. Similarly, a single crank 132 and a roller chain and sprocket arrangement 133 are used to simultaneously turn both of the rearward pair of bolts 127.

The longitudinal spacing between the forward T-shaped members 118 and the rearward T-shaped members may be adjustably varied by providing an upper and lower longitudinally-extending slide bar, 134 and 135, respectively, on each side of the machine. The ends of bars 123 are slidably attached to each bar 134 through blocks 136 and the ends of bars 124 are slidably attached to each of bars 135 through blocks 137. The sliding movement of mounting plates 125 and 126 on bars 134 and 135 is accomplished by either of a pair of longitudinally-extending bolts 138, threaded in opposite directions on each end, and disposed on opposite sides of the machine, each of which passes through internally threaded attachments 139 and 141 of mounting plates 125 and 126, respectively. Bolts 138 are interconnected by a bevel gear drive arrangement 142 for simultaneous rotation.

Slide bars 135 are attached to the adjacent of members 21 and 22 through a pair of spaced mounting blocks 143. Slide bars 134 are attached to the adjacent of upper, longitudinally-extending machine frame members 144 and 145. Members 144 and 145 are, in turn, supported on the underlying of members 21 and 22 through spaced vertical columns 146.

It is to be noted, for optimum tray-forming action, that the lower edges of each of the legs of L-shaped members 101 of mandrel 53 lie in a common plane in contact, during the tray-forming cycle, with the top surface of the subjacent blank. As a further refinement of the present invention, however, the longitudinally extending leg of each member 101 has depending from the lower edge thereof a thin member 147 extending downwardly therefrom to a location slightly beneath the top surface of the blank. When mandrel 53 is closely outlined by the central panel B1 of the blank, the lower edges of members 147 will lie along one or another of longitudinal score lines B6 and B8. Thus, members 147 will serve to rescore the blank along lines B6 and B8, in the event that the original scores have substantially faded due to prolonged storage, to insure accurate folding of panels B2 and B4 along lines B6 and B8.

The folding of the various panels and flaps of the tray blank into upright positions, relative to the central panel, is performed mechanically in a predetermined sequence beginning with the simultaneous upright folding of the side panels (B2 and B4) (except in the case of deep trays with overlapping end panels in which case the folding is performed in sequence), as is shown in FIG. 3 and, in somewhat greater detail, in FIGS. 4–9. The upright folding of the side panel is accomplished by a pair of spaced panel folders 151 each of which is pivoted for a limited degree of rotation about a horizontal axis near the upper end of the longitudinally extending leg of member 118, most conveniently, as shown, on the same axis as stabilizing bar 117. Each panel folder 151 is pivoted to and fro between a retracted position and an upright position by means of a pneumatic cylinder 152 which is supported from a lower portion of T-shaped member 118.

The arcuate movement of each panel folder to an upright position is effective to simultaneously effect inward arcuate movement of a flap folder 153, without the need for a separate pneumatic actuating device, to fold the adjacent corner flap to an upright transversely extending position. Each flap folder 153 is pivoted for arcuate movement about an axis in a vertical transversely extending plane through an edge of the associated side panel folder 117, as is shown especially in FIG. 6. Movement of the flap folder about its axis of rotation is effected, directly by the rotation of the associated panel folder, by the camming action between a cam follower 154 attached to flap folder and a serpentine cam 155 which is attached to the rod eye axis of cylinder 152 in a manner to be free floating around the end of the cylinder rod. The relationship between the cam follower 154 and the serpentine cam 155 is shown, at the extremes of the cycle, in FIG. 8.

After the side panels and end flaps have been folded to their desired upright positions and preferably, for rapid forming action, before panel folders 151 and flap folders 153 have been retracted, the end panels (B3 and B5) are folded to partially upright positions, folding to completely upright positions being precluded by the physical presence of flap folders 153. Each flap is folded to its partially upright position by the action of a pair of spaced end panel folders 156 rigidly attached to a common, transversely extending shaft 157, as is shown most clearly in FIG. 5 where, for the sake of clarity, panel folders are shown retracted away from the extended positions which they normally occupy at this stage of the cycle, as is indicated by the arcuate arrows. The forward of shafts extends between, and is rotationally mounted to, mounting plates 125 and the rearward of shafts 157 is similarly arranged with respect to mounting plates 126. For sake of clarity, the forward pair of panel folders 156, and the portion of the shaft 157 to which they are attached, are shown in a position remote from the true or actual position, as indicated by arrow 158. Each shaft 157 is turned to and fro through a limited arc by the action of a pneumatic cylinder 159 which is operatively connected between the shaft and one of the mounting plates between which the shaft extends.

After the end panels have been folded to their upright positions and, for reasons of speed, preferably before any of the panel and flap folders have been retracted, the stabilizing bars 117 are retracted and the partly-formed tray is moved downwardly into the rectangular chamber defined by portions of T-shaped members. Movement of the tray into the chamber is effected by further advance of mandrel 53 and is effective to complete the folding of the end panels of the tray to upright positions in firm contact with the adhesive bearing surfaces of the underlying flaps. The tray is retained in the chamber, notwithstanding retraction of mandrel 53 to its uppermost position for the start of a new tray-forming cycle, by the action of a catch 161 pivotally attached to the upper edge of the interior side of the transversely extending leg of each T-shaped member 118. Each catch is counterweighted or spring loaded to normally maintain it in interfering relationship with the movement of trays through the compression chamber defined by members 118. Since the catches are pivotally mounted from the top, however, they are readily deflected to non-interfering positions by a tray as it is being introduced into the compression chamber and they do not return to the interfering positions until after the top of the tray passes beneath the lower edges of the catches.

Description of the tray-former—motions and motion controls (FIGS. 10–14)

FIGS. 10–14 show, in schematic form, the circuitry for delivering actuating air to pneumatic cylinders 86, 111, 116 152 and 159. In cases where a multiplicity of cylinders of a given type are employed, for example, in the case of stabilizing bar actuation cylinders 116, only a single cylinder is shown and it is to be understood that the circuitry for the other cylinders of the same type is the same as that shown for the single cylinder. The flow of actuation air to and from cylinders 86, 116, 152 and 159 is controlled by the position of 4-way double acting directional valves P8, P5, P6 and P7, respectively, which are shifted back and forth between their operative positions under influence of the pressure of control air from control system air, as will be more fully explained in conjunction of the description of FIG. 15. Each of valves P8, P5, P6 and P7 is in communication with a high pressure air source, as indicated by the arrow leading to the underside of the valve.

The flow of actuation air to cylinder 111 is controlled, initially, by a 4-way double acting valve P.4. Because of the fact that the movement of mandrel 53 from its uppermost position to its intermediate tray-forming position is preferably slower and gentler than is its movement from its tray-forming position downwardly to the compression chamber, and its retraction, movement valve P4 is in communication both with high pressure and low pressure plant air sources, as indicated by the arrows leading to the underside of the valve P4. The direction of movement of the piston of cylinder 111 by the air from valve P4 is controlled by a 4-way double acting directional valve P3, analogous to valves P8, P5, P6 and P7, which is in communication with the outlet of valve P4. Also provided in the path of the flow of air from directional valve P3 to each side of the piston of cylinder 111 is a 2-way double-acting locking valve, valves P1 and P2, respectively, which serve to lock the piston in an intermediate position, between the extremes of its travel, to position mandrel 53 at the tray-forming station. As in the case of valves P8, P5, P6 and P7, valves P1–P4 are shifted back and forth between their operative positions under influence of the pressure of the control system air. For purposes of description, each of valves P1–P8 is illustrated as being shiftable in a horizontal position between a first or A position on the left and a second or B position on the right. FIGS. 10–14 show all cylinders in the position which they normally occupy at the start of a tray-forming cycle, viz, with the tray-making machine in an "on" condition and with feed table back, stabilizers down, side panels down, mnadrel up and end panels down. The control system of FIG. 15 is shown at the same point in time, with control air pressure against the B side of valve P3 (mandrel up) and with relay switches RV2, RV3, RV4 and RV5, which are discussed hereinafter more fully, in their B position, as shown by cross-hatching of the appropriate control elements shown in the vertical column at right of FIG. 15.

Figure 15:
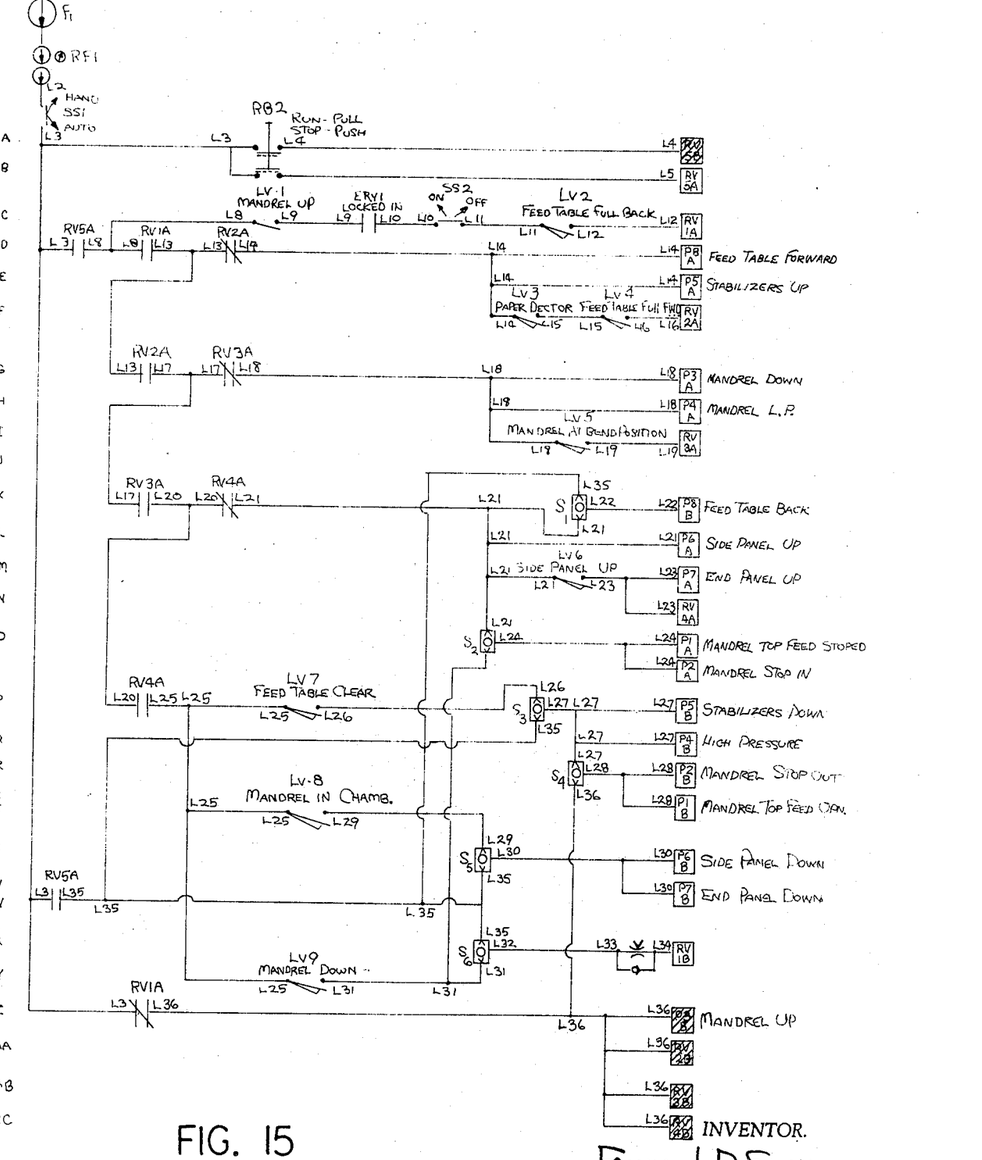
FIG. 15 is a circuit diagram of a pneumatic circuit for delivering compressed air to the various valves and control components for controlling actuation of the cylinders of FIGS. 10–14.

Control signal air is delivered to the control circuit of FIG. 15 from a non-lubricated plant air supply through a primary filter F1 and then, through line L1, to a regulator filter RF1 for delivery to the circuit at a regulated pressure, viz, at 50 p.s.i.g. From filter RF1 the air flows, through line L2, to a selector switch SS1 which may be manually set either for manual, or single cycle, operation or, more commonly, for continuous operation, on the "automatic" setting.

Signal air from switch SS1 flows through line L3 to control elements shown at various levels on the control circuit, as identified by the leters A–CC arranged from top to bottom at the left of FIG. 15. Depending on whether push button PB–2 is in the "run" position, which is the illustrated and normal position, or in the "stop" position, signal air, flowing through line L4, will urge a relay switch RV5 to the B position, as shown at level A, or, through line L5, it will urge relay switch RV5 to the A position, as shown at level B.

When relay switch RV5 is not in the A position, as shown at level D, signal air will flow through it from line L3 to line L8 from whence it may ultimately flow, through lines L8, L9, L10, L11 and L12 to move relay switch RV1 to the A position, as shown at level C. The flow of air to relay switch RV1 will be interrupted: if limit valve LV1 is not depressed, which is caused by having the mandrel in the up position; if LV2 is not depressed, which is caused by having the feed table in its fully retracted position; if an "on"-"off" manual selector switch SS2 is not in the "on" position; and, in a special refinement of the invention, if an electric relay valve ERV1 is not locked in. In an automated plant, relay valve ERV1 is normally tied into another piece of equipment whose operation is indicative of the need for trays, for example, the lehr in a glass container manufacturing plant.

When relay valve RV1 is moved to the A pisition, the connection from line L3 to L36 (at level Z) will close and the connection from line L8 to line L13 (at level D) will open. Signal air in line L13 will then flow through open relay switch RV2 to line L14 (on level D) from whence: it will move valve P8 to the A position, thereby causing the feed table cylinder 86 to advance; it will move valve P5 to the A position, thereby causing stabilizer cylinders 116 to advance; and, through lines L14, L15 and L16 it will move relay valve RV2 to the A position, thereby closing the circuit from line L13 to line L14 and opening the circuit from line L13 to line L17 (at level G). The flow of signal air through lines L14 to L16 will, however, be interrupted if limited valves LV3 and LV4 are not depressed. Limit valve LV3 is depressed by contact with blanks in the magazine and will open only when the supply of blanks is inadequate. Limit valve LV4 will be depressed when, and if, the feed table completes its forward advance.

When the circuit opens from line L13 to line L17 through relay switch RV2, signal air will flow, through relay switch RV3 in its A position, to line L18 which will then move valve P4 to the A, or low pressure, position (at level H) and will move directional valve to the A, or downward stroke, position (at level G). When the mandrel reaches its intermediate or bend position, it will depress limit valve LV5 (at level I) thereby allowing signal air to pass through line L19 switch relay switch RV3 to the A position.

When relay switch RV3 is moved to the A position, the circuit through RV3 from line L17 to L18 will open and the circuit from line L17 to L20 (at level K) will close which will allow signal air to pass through relay switch RV4 from line L20 to line L21. From line L21 signal air will pass: through a two-station shuttle assembly S1 to line L22 and then to the B side of directional valve P8 to cause retraction of feed table cylinder 86 (at level K); to the A side of directional valve P6 to cause side panel cylinders 152 to move up (at level L); after the LV6 is depressed when the side panel folders are in the up position, to the A side of directional valve P7 to move the end panel folder cylinders 159 to the up position (at level M) and to move relay switch RV4 to the A position (at level N); and, through two-station shuttle assembly S2, to line L24 to move locking valves P1 and P2 to the A or locked positions (at level O).

When relay switch RV4 is in the A position, the flow of signal air from line L20 to line L21 will be closed and the flow from line L21 to line L25 will be opened (at level P). Signal air from line L25 will flow to line L26 when limit valve LV7 is depressed, upon retraction of the feed table, and signal air will then flow through two-station shuttle assembly S3, to line L27. Signal air in line L27 will: return directional valve P5 to the B position (at level P) to retract stabilizer cylinders 116; it will move valve P4 to the B or high pressure position (at level Q); and it will flow, through two-station shuttle assembly S4, to line L28 where it will move locking valves P1 and P2 to the B or unlocked positions (levels R and S). Signal air from line L25 will also flow to a limit valve LV8 (level T) which will be depressed when the mandrel reaches the chamber to allow signal air to flow, through line L29 and two-station shuttle assembly S5 to line L30 (level U), which will cause directional valves P6 and P7 to move to the B positions for retraction of the side panel and end panel cylinders 152 and 159. When the mandrel reaches its lowermost position, it will depress a limit valve LV9 (level Y), which will pass signal air from line L25 to line L31 and thence, through two-station shuttle assembly S6, through lines L32, L33, a metering orifice, and line L34 to move relay switch RV1 to the B position (level X), thereby closing the circuit from line L8 to L13 and reopening the circuit from line L3 to L36. Signal air flowing through line L36 will return directional valve P3 to the B or up position (level Z) and will switch relay switches RV2, RV3 and RV4 to the B positions (levels AA, BB and CC) thereby closing the circuits from lines L13–L14, L17–L18 and L20–L21 and opening the circuits from lines L13–L17, L17–L20 and L20–L25.

As a safety feature, when push button PB2 is depressed to stop the machine, causing switching of relay switch RV5 to the A position, the circuit from line L3–L8 will be broken and the circuit from line L3–L35 will be opened. Signal air in line L35 will then flow to two-station shuttle assemblies S1, S3, S5 and S6 thereby retracting feed table, stabilizer, side panel and end panel cylinders 86, 116, 152 and 159 and moving the relay switch RV1 to the B position to break the circuit from the line L8–L13 and to open the circuit from line L3–L36. As additional safety features, the mandrel cylinder locking valves P1 and P2 are also moved to the A or locking positions when the mandrel is at its lowermost position by connecting line L31 to the other port of shuttle assembly S2, and locking valves P1 and P2 are moved to the unlocked or B positions by connecting line L36 to the other port of shuttle assembly S4.

It is believed that the best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:
1. In apparatus for horizontally transferring a pre-cut and scored blank of corrugated fibreboard from the bottom of a generally vertcal stack of such blanks in the magazine station of a tray forming machine past an adhesive station, where adhesive is applied to selected portions of such blank, to a forming station on the other side of said adhesive station, the combination comprising: a tubular transfer member having a relatively flat, foraminous blank-engaging surface; means for reciprocating said transfer member from said magazine station past said adhesive station to said forming station and thence back to said magazine station; a vacuum pump for maintaining a sub-ambient pressure within said transfer member; conduit means extending between said pump and said transfer member, said conduit means having a non-reciprocatory portion which is disposed interiorly of transfer member co-axially and relatively slidably interengaged therewith; and disengaging means for disengaging the blank from the transfer member at the forming station.

2. Apparatus according to claim 1 wherein said conduit means further comprises a second portion having an opening disposed at a location away from the transfer member, said opening being adapted to be normally closed by a movable closure gate; and wherein the disengaging means comprises a movable closure gate normally closing said opening, and operator means separate from the transfer member for moving the movable closure gate to a non-closing position as the transfer member is being returned from the forming station to the magazine station.

3. Apparatus according to claim 1 wherein each of said blanks comprises a pair of thin elongate notches extending inwardly at right angles from each of an opposed pair of edges of said blanks, and further comprising magazine means containing a generally vertical stack of blanks in position above the transfer member at said magazine station, said magazine means comprising means engageable with said slots of the blanks for positioning of the blanks at the magazine station in a direction transversely of the slots.

4. Apparatus according to claim 3 and further comprising: means at said adhesive station for applying adhesive to selected portions of each of said blanks as it is being transferred to the forming station; and means at the forming station for forming such adhesive-bearing blank into a five-sided container.

5. Apparatus according to claim 3 wherein said magazine means further comprises gate means blocking the movement of articles in said stack in a direction to said second location, said gate means extending downwardly to a location which is spaced above the top of said transfer member by a distance greater than the thickness of one of said articles and less than the thickness of two of said articles.

6. Apparatus according to claim 4 wherein the disengaging means further comprises means at the forming location for firmly grasping the blanks before said transfer member is retracted to its magazine position.

References Cited

UNITED STATES PATENTS

| | | | |
|---|---|---|---|
| 3,111,885 | 11/1963 | Perrelli | 93—49.1 |
| 3,196,761 | 7/1965 | Ullman | 93—49 |
| 3,226,108 | 12/1965 | Bishop | 271—32 |

BERNARD STICKNEY, Primary Examiner

U.S. Cl. X.R.

93—49; 271—32